(12) United States Patent
Krueger et al.

(10) Patent No.: US 7,648,653 B2
(45) Date of Patent: Jan. 19, 2010

(54) CONDUCTIVE POLYOXYMETHYLENE COMPOSITION

(75) Inventors: David C. Krueger, Grosse Ile, MI (US);
Majiid Khalatbri, Saline, MI (US);
Wolfgang Heim, Mobile, AL (US);
Theodore Zavadil, Wyandotte, MI (US)

(73) Assignee: BASF SE, Ludwigshafen (DE)

( * ) Notice: Subject to any disclaimer, the term of this patent is extended or adjusted under 35 U.S.C. 154(b) by 228 days.

(21) Appl. No.: 11/813,965

(22) PCT Filed: Jan. 12, 2006

(86) PCT No.: PCT/EP2006/000210

§ 371 (c)(1),
(2), (4) Date: Jul. 13, 2007

(87) PCT Pub. No.: WO2006/074922

PCT Pub. Date: Jul. 20, 2006

(65) Prior Publication Data

US 2008/0121847 A1    May 29, 2008

Related U.S. Application Data

(60) Provisional application No. 60/644,299, filed on Jan. 14, 2005.

(51) Int. Cl.
*H01B 1/08* (2006.01)
*H01B 1/24* (2006.01)
*H01B 1/04* (2006.01)

(52) U.S. Cl. .............. 252/511; 252/510; 252/500; 252/521.4

(58) Field of Classification Search .......... 252/511, 252/510, 500, 521.4
See application file for complete search history.

(56) References Cited

U.S. PATENT DOCUMENTS

| | | | | |
|---|---|---|---|---|
| 3,960,964 A | * | 6/1976 | Suggitt et al. | 564/494 |
| 3,960,984 A | * | 6/1976 | Kohan | 525/400 |
| 4,506,053 A | * | 3/1985 | Sakurai et al. | 524/405 |
| 4,555,357 A | * | 11/1985 | Kausga et al. | 252/511 |
| 5,364,908 A | * | 11/1994 | Oishi et al. | 525/64 |
| 5,424,338 A | * | 6/1995 | Krueger | 521/174 |
| 6,930,145 B2 | * | 8/2005 | Kudou et al. | 525/66 |
| 2002/0123570 A1 | * | 9/2002 | Kudou et al. | 525/107 |

FOREIGN PATENT DOCUMENTS

| | | | | |
|---|---|---|---|---|
| DE | 102004005419 A1 | * | 8/2005 | |
| EP | 0 831 117 | | 3/1998 | |
| JP | 2002 128986 | | 5/2002 | |
| JP | 2003041091 A | * | 2/2003 | |
| JP | 2004010803 A | * | 1/2004 | |
| JP | 2005 255734 | | 9/2005 | |

* cited by examiner

*Primary Examiner*—Douglas Mc Ginty
(74) *Attorney, Agent, or Firm*—Connolly Bove Lodge & Hutz LLP

(57) ABSTRACT

A conductive polyoxymethylene composition comprising a first polyoxymethylene component, a conductive filler, at least one boron oxyacid or salt thereof, and at least one first polyamide oligomer is disclosed. The first polyoxymethylene component comprises a copolymer of oxymethylene, a homopolymer of oxymethylene, and mixtures thereof, and is present in an amount of from about 50 to about 99.5 weight percent based on the total weight of the composition. The conductive filler is present in an amount of from about 0.1 to about 40 percent by weight based on the total weight of the composition. The boron oxyacid or salt thereof and the first polyamide oligomer stabilize the composition such that articles formed therefrom exhibit reduced or eliminated deterioration. Further, when exposed to higher temperature, pressure, and high-fuel content environments, the articles maintain the desired physical properties.

33 Claims, 3 Drawing Sheets

CONDUCTIVE POLYOXYMETHYLENE COMPOSITION

CROSS REFERENCE TO RELATED APPLICATION

This application is a National Phase filing under 35 U.S.C. § 371 of PCT/EP2006/000210 filed Jan. 12, 2006, which claims priority to U.S. Provisional Application No. 60/644,299, filed Jan. 14, 2005. The entire contents of each of the above-applications are incorporated herein by reference.

BACKGROUND OF THE INVENTION

1. Field of the Invention

The subject invention generally relates to conductive polymers and more particularly to electrically conductive, static-dissipative, and anti-static polyoxymethylene compositions that have improved resistance to deterioration 2. Description of the Prior Art Electrically conductive polymeric materials are desirable for many applications including the dissipation of electrostatic charge from parts, electrostatic spray painting, and the shielding of electrical components to prevent transmission of electromagnetic waves. The primary method of increasing the electrical conductivity of polymers is to fill the polymers with conductive additives such as metallic powders, metallic fibers, ionic conductive polymers, intrinsically conductive polymeric powder, e.g., polypyrrole, carbon fibers or carbon black. However, these approaches have shortcomings. For example, metallic fibers and polymeric powders have poor corrosion resistance and insufficient mechanical strength. Further, their density makes high weight loadings necessary; therefore, their use is frequently impractical.

When polyacrylonitrile ("PAN") or pitch-based carbon fibers are added to a base resin to create conductive polymers, the high filler content necessary to achieve conductivity results in the deterioration of the characteristics specific to the base resin. If a final product with a complicated shape is formed by injection molding, uneven filler distribution and fiber orientation tends to occur due to the relatively large size of the fibers, which results in non-uniform electrical conductivity.

Carbon black has become the additive of choice for many applications. The use of carbon black, however, also has a number of significant drawbacks. First, the quantities of carbon black needed to achieve conductivity of the polymer are relatively high. Second, the high morphological "structure" of conductive carbon blacks is subject to breakdown during high shear melt processing. This morphological structure contributes to a reduction of toughness characteristics of a formed part to the point where the characteristics become too low for many applications. Even when toughness levels are suitable for a given application, the sloughing or rubbing off of the carbon black from the surface of the product may be a problem. Finally, the chemical impurities which are inherent in and result from the typical carbon black manufacturing process, make the use of these materials impractical in, for example, automobile parts.

Carbon nanotubes have been used in place of carbon black in a number of applications. For example, it has been recognized that the addition of carbon nanotubes to polymers in quantities less than that of carbon black, can be used to produce conductive end products. It has also been recognized that the addition of carbon nanotubes to polymers can be used to enhance the tensile and flexural characteristics of end products.

Carbon nanotubes are typically in the form of vermicular tubes with graphitic outer layers disposed substantially concentrically about the cylindrical axis of the nanotube. The nanotubes are typically substantially free of a pyrolytically deposited thermal carbon overcoat.

Carbon nanotubes typically have a length-to-diameter ratio of at least 5 and are carbon filaments that have diameters less than 500 nanometers. The wall thickness of the nanotubes is about 0.1 to 0.4 times the external diameter of the nanotubes, which is usually between 3.5 and 75 nanometers. In applications where high strength nanotubes are needed, e.g., where the nanotubes are used as reinforcements, the external diameter is substantially constant over its length.

One drawback to carbon nanotubes is that the carbon nanotubes are acidic and tend to escalate deterioration of the properties of the base resin. This deterioration tends to increase when the article formed from the composition is exposed to specific environments, such as high temperature or pressure environments or high fuel content environments. As one example, when the base resin is polyacetal, or polyoxymethylene, and when the components are used for automotive fuel systems, these components are subjected to a high fuel content environment. Therefore, the deterioration of the components is highly undesirable.

SUMMARY OF THE INVENTION AND ADVANTAGES

The subject invention provides a conductive polyoxymethylene composition. The composition comprises a first polyoxymethylene component, a conductive filler, at least one boron oxyacid or salt thereof, and at least one first polyamide oligomer. The first polyoxymethylene component comprises a copolymer of oxymethylene, a homopolymer of oxymethylene, and mixtures thereof, and is present in an amount of from about 50 to about 99.5 weight percent based on the total weight of the composition. The conductive filler is present in an amount of from about 0.1 to about 40 percent by weight based on the total weight of the composition.

The subject invention provides a composition that overcomes the inadequacies that characterize the related art. Specifically, the combination of the boron oxyacid or salt thereof and the polyamide oligomer provide stability to the composition and articles formed therefrom. Further, the subject invention provides articles that can be exposed to caustic environments, such as fuel environments, and have reduced deterioration as a result of the stability of the composition. The subject invention also provides a solution for the acidity of the conductive filler deteriorating the articles such that the physical properties of the articles remain adequate for longer periods of time.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

A conductive polyoxymethylene composition for forming an article having improved resistance to deterioration when exposed to various environments is disclosed. In addition to the improved resistance, articles formed from the composition of the subject invention are able to provide a desired volume resistivity depending again upon the various environments. For example, articles in fuel environments of automotive applications require a volume resistivity of less than $10^6$ Ohm-cm in accordance with SAE J1645 "Fuel System-Electrostatic Charge". Other environments may desire the volume resistivity to be between $10^4$ to $10^8$ Ohm-cm. Depending upon the particular application, the subject application is able to provide the article having improved resistance to deterioration with the desired volume resistivity. The composition generally comprises a first polyoxymethylene component, a conductive filler, at least one first polyamide oligomer, and at least one boron oxyacid or salt thereof.

The first polyoxymethylene component comprises a copolymer of oxymethylene, a homopolymer of oxymethylene, and mixtures thereof. The homopolymers are generally prepared by polymerizing formaldehyde or trioxane, preferably in the presence of suitable catalysts. The homopolymer is composed of oxymethylene repeating units (—CH2O—).

Copolymers of this type are known to those skilled in the art and generally, these polymers have at least 50 mol % of repeating units —CH$_2$O— in the main chain of the polymer. For the purposes of the present invention, copolymers of oxymethylene are preferred, in particular those which, in addition to the repeating units —CH$_2$O—, also contain up to 50, preferably from 0.1 to 20, in particular from 0.3 to 10, mol % of repeating units where $R^1$ to $R^4$ independently of one another are each hydrogen, $C_1$-$C_4$-alkyl or halogen-substituted alkyl of 1 to 4 carbon atoms, $R^5$ is —CH$_2$—, —CH$_2$O— or a $C_1$-$C_4$-alkyl- or $C_1$-$C_4$-haloalkyl-substituted methylene group, or a corresponding oxymethylene group, and n is from 0 to 3. These groups can be advantageously introduced into the copolymers by ring cleavage of cyclic ethers as illustrated in U.S. Pat. No. 5,369,177, which is incorporated herein by reference in its entirety.

Preferred first polyoxymethylene components have melting points of at least 150° C. and weight average molecular weights, Mw, of from 5,000 to 200,000, preferably from 7,000 to 150,000. More preferably, the first polyoxymethylene components are stabilized at terminal groups and have C—C bonds at the chain ends.

The first polyoxymethylene component is present in an amount of from about 50 to about 99.5, preferably from 60 to 99, in particular from 70 to 98.5, weight percent based on the total weight of the composition. One preferred first polyoxymethylene component is commercially available as Ultraform® from BASF Corp. Commercially available polyoxymethylene components typically have a resistivity of about $10^{14}$ Ohm-cm and acts as an insulator.

The first polyoxymethylene component further comprises a second polyamide oligomer, a toughened polymer, an antioxidant, a light stabilizer component, and an epoxy-containing compound, as is well known to those of ordinary skill in the art.

The second polyamide oligomer may be semicrystalline or amorphous resins, as understood by those skilled in the art, and has a melting point of preferably less than 225° C., particularly preferably less than 215° C. The second polyamide oligomer has a weight-average molecular weight of from about 800 to about 10,000. As is well known, such polyamide oligomers have internal linkages and terminal ends. The internal linkages are preferably derived from at least one of hexamethylene diamine and diethyl adipate, hexamethylene diamine and dodecanedioic acid, hexamethylene diamine and isophthalic acid, hexamethylene diamine, dodecanedioic acid and caprolactam, or hexamethylene diamine, adipic acid and caprolactam.

Examples of the second polyamide oligomer include, but are not limited to, polyhexamethyleneazelaamide, polyhexamethylenesebacamide, polyhexamethylenedodecanediamide, poly-11-aminoundecanamide and bis-(p-aminocyclohexyl)-methanedodecanediamide, or the products obtained by ring cleavage of lactams, e.g. polylaurolactam or laurolactam. Polyamides based on terephthalic or isophthalic acid as the acid component and/or trimethylhexamethylenediamine or bis(p-aminocyclohexyl)propane as the diamine component and polyamide base resins which have been prepared by copolymerizing two or more of the abovementioned polymers or components thereof are also suitable.

Second polyamide oligomers based on caprolactam, hexamethylenediamine, p,p'-diaminodicyclohexylmethane, and adipic acid are particularly suitable polyamides. More preferably, the second polyamide oligomer is a copolymer of caprolactam, hexamethylenediamine, and adipic acid, and propionic acid is utilized to cap the terminal ends of the polyamide oligomer and the second polyamide oligomer has a molecular weight of about 3000 g/mol. A preferred second polyamide oligomer is the product sold under the name Ultramid® 1C by BASF Aktiengesellschaft. Another suitable second polyamide oligomer is sold by Du Pont under the name Elvamide®.

The second polyamide oligomer has a ratio of terminal amino groups to terminal acid groups that is controlled by varying the molecular ratio of the starting compounds. Preferably, the second polyamide oligomer is dicapped, i.e., there are no free terminal amino groups or terminal acid groups on the terminal ends. Various components may be used to cap the polyamide oligomer as is well known to those skilled in the art, such as monobasic or dibasic carboxylic acids.

The amount of the second polyamide oligomer in first polyoxymethylene component is from about 0.005 to about 2, preferably from about 0.01 to about 1, in particular from about 0.01 to about 0.75, weight percent based on the total weight of the first polyoxymethylene composition.

The toughened polymer, which is also referred to below as elastomeric polymer or elastomer, is present in the first polyoxymethylene component in an amount from 0 to about 50, preferably from 0 to about 40, weight percent based on the total weight of the first polyoxymethylene composition. Preferred types of such toughened polymers are the ethylene/propylene (EPM) rubbers or ethylene/propylene/diene (EPDM) rubbers. EPM rubbers generally have no double bonds, whereas EPDM rubbers may have from 1 to 20 double bonds/100 carbon atoms.

Examples of diene monomers for EPDM rubbers are conjugated dienes, such as isoprene and butadiene, nonconjugated dienes of 5 to 25 carbon atoms, such as penta-1,4-diene, hexa-1,4-diene, hexa-1,5-diene, 2,5-dimethylhexa-1,5-diene and octa-1,4-diene, cyclic dienes, such as cyclopentadiene, cyclohexadiene, cyclooctadiene and dicyclopentadiene, and alkenylnorbornenes, such as 5-ethylidene-2-norbornene, 5-butylidene-2-norbornene, 2-methallyl-5-norbornene or 2-isopropenyl-5-norbornene and tricyclodienes, such as 3-methyltricyclo[5.2.1.0.2.6]-3,8-decadiene, or mixtures thereof. Hexa-1,5-diene, 5-ethylidenenorbornene and dicyclopentadiene are preferred. The diene content of the EPDM rubbers is preferably from about 0.5 to about 50, in particular from about 1 to about 8, weight percent based on the total weight of the rubber.

The EPDM rubbers can also be grafted with further monomers, for example with glycidyl (meth)acrylates, (meth)acrylates and (meth)acrylamides. A further group of preferred rubbers comprises copolymers of ethylene with esters of (meth)acrylic acid. The rubbers may furthermore contain epoxy-containing monomers, as described in U.S. Pat. No. 5,369,177.

The antioxidant present in the first polyoxymethylene component is preferably a sterically hindered amino compound. Preferred compounds include, but are not limited to, derivatives of 2,2,6,6-tetramethylpiperidine, such as 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-methoxy-2,2,6,6-tetramethylpiperidine, 4-benzoyloxy-2,2,6,6-tetramethylpiperidine, 4-cyclohexyloxy-2,2,6,6-tetramethylpiperidine-4-phenoxy-2,2,6,6-tetramethylpiperidine, 4-benzyloxy-2,2,6,6-tetramethylpiperidine, and 4-(phenylcarbamoyloxy)-2,2,6,6-tetramethylpiperidine.

Other suitable antioxidants include bis(2,2,6,6-tetramethyl-4-piperidyl) oxalate, bis(2,2,6,6-tetramethyl-4-piperidyl) malonate, bis(2,2,6,6-tetramethyl-4-piperidyl) adipate, bis(2,2,6,6-tetramethyl-4-piperidyl) sebacate, bis(1,2,2,6,6-pentamethylpiperidyl) sebacate, bis(2,2,6,6-tetramethyl-4-piperidyl) terephthalate, 1,2-bis(2,2,6,6-tetramethyl-4-piperidyloxy)ethane, bis(2,2,6,6-tetramethyl-4-piperidyl) hexamethylene-1,6-dicarbamate, bis(1-methyl-2,2,6,6-tetramethyl-4-piperidyl) adipate, and tris(2,2,6,6-tetramethyl-4-piperidyl) benzene-1,3,5-tricarboxylate.

Furthermore, relatively high molecular weight piperidine derivatives, such as the dimethyl succinate polycondensate with 4-hydroxy-2,2,6,6-tetramethyl-1-piperidylethanol or poly 6-(1,1,3,3-tetramethylbutyl)amino-1,3,5-triazine-2,4-diyl(2,2,6,6-tetramethyl-4-piperidinyl)imino-1,6-hexanediyl(2,2,6,6-tetramethyl-14-piperidinyl) imino, are suitable. Compounds of this type are commercially available under the name Tinuvin® from Ciba Geigy AG.

The antioxidant is present in the first polyoxymethylene component in an amount of from about 0.1 to about 2, preferably from about 0.2 to about 1.5, in particular from about 0.2 to about 1, weight percent based on the total weight of the first polyoxymethylene composition.

The light stabilizer is preferably a UV light stabilizer and is more preferably selected from benzotriazole derivatives or benzophenone derivatives or aromatic benzoate derivatives. The light stabilizer is present in the first polyoxymethylene component in an amount of from about 0.1 to about 2, preferably from about 0.2 to about 1.5, in particular from about 0.2 to about 1, weight percent based on the total weight of the first polyoxymethylene composition.

Suitable benzotriazole derivatives include, but are not limited to: 2-(2-hydroxy-5-methylphenyl)-benzotriazole, 2-(2-hydroxy-3,5-di-tert-butylphenyl)-benzotriazole, 2-(3,5-di-tert-amyl-hydroxyphenyl)-benzotriazole, 2-(2'-hydroxy-3',5'-diisoamylphenyl)-benzotriazole, 2-[2'-hydroxy-3',5'-bis(1,1-dimethyl-benzyl)phenyl]benzotriazole, 2-(2'-hydroxy-4-octyloxyphenyl)-benzotriazole, 2-(2H-benzotriazole-2-yl)-4-(1,1,3,3-tetramethylbutyl)-phenol, 2-(2H-benzotriazole-2-yl)-2,4-(tert-butyl)-phenol, 2-(2H-benzotriazole-2-yl)-4-(1,1-dimethylethyl)-6-(1-methylpropyl)-phenol and 2-(2H-benzotriazole-2-yl)-4,6-bis(1,1-dimethylpropyl)-phenol. Compounds of this type are commercially available under the name Chimassorb®, from Ciba Geigy AG.

Preferred benzophenone derivatives are: 2,4-dihydroxybenzophenone, 2-hydroxy-4-methoxybenzophenone, 2-hydroxy-4-octyloxybenzophenone, 2-hydroxy-4-dodecyloxybenzophenone, 2,2-dihydroxy-4-methoxybenzophenone, 2,2-dihydroxy-4,4-dimethoxybenzophenone, 2-hydroxy-4-methoxy-5-sulfobenzophenone and 2-hydroxy-4-oxybenzylbenzophenone. Examples of aromatic benzoate derivatives include p-tert-Butylphenyl salicylate and p-octylphenyl salicylate.

The epoxy-containing compound is present in an amount from about 0 to about 2, preferably from about 0.1 to about 2, particularly preferably from about 0.2 to about 1.5, in particular from about 0.2 to about 1, weight percent based on the total weight of the first polyoxymethylene component.

According to the subject invention, the epoxy-containing compounds may include monomeric and oligomeric (poly) condensates of halogenated epoxides, preferably epichlorohydrin, with aromatic, aliphatic or cycloaliphatic alcohols or carboxylic acids of up to about 30, preferably up to about 20, carbon atoms or cyanuric acid. Such products are commercially available under the name Epikote® from Shell Chemicals.

The epoxy-containing compounds have an epoxide number of from about 0.1 to about 15, preferably from about 0.3 to about 11, equivalents/kg, which is determined in general according to DIN 16,945 (Method A or B).

The composition also includes the conductive filler. Without intending to be bound to theory, it is believed that the conductive filler is at least slightly acidic which increases the deterioration of the polyoxymethylene component. One example of the conductive filler is carbon nanotubes. It is to be appreciated that the conductive filler may include a mixture of other conductive fillers, such as carbon black, conductive wollastonite, conductive carbon powders, and the like; however, it is preferred that the conductive filler are conductive fibers. Carbon nanotubes typically have the form of tubes formed from graphite layers. The graphite layers are concentrically arranged around the cylinder axis. The carbon nanotubes may be single walled or multi-walled.

Carbon nanotubes have a length to diameter ratio of at least about 5, preferably at least about 100, particularly preferably at least about 1,000. The diameter of the nanotubes is typically in the range of about 3 to about 500 nanometers, preferably in the range of about 5 to about 80 nanometers, particularly preferably in the range of about 6 to about 50 nanometers. The length of the carbon nanotubes is typically about 0.5 to about 1,000 µm, preferably about 0.8 to about 100

µm, particularly preferably about 1 to about 10 µm. The carbon nanotubes have a hollow cylindrical core around which the graphite layers are formally wound (i.e. the graphite layers are twised around the hollow core). This cavity typically has a diameter of about 0.001 to about 0.1 µm, preferably a diameter of about 0.008 to about 0.015 µm. In a typical embodiment of the carbon nanotubes, the wall of the nanotubes around the cavity may include eight graphite layers. The carbon nanotubes may be present as aggregates of up to about 1,000 µm in diameter, preferably up to about 500 µm in diameter made of a plurality of nanotubes. The aggregates may have the form of a bird nest, of combed yarn, or of open network structures.

The carbon nanotubes may be added the composition prior to, during or after polymerization of the monomers to form the first polyoxymethylene component. Carbon nanotubes are commercially available from Hyperion Catalysis or Applied Sciences Inc.

The conductive filler is present in an amount of from about 0.1 to about 40 weight percent based on the total weight of the composition. Preferably, the conductive filler is present in an amount of from about 0.5 to about 25, and more preferably about 1 to about 15, weight percent based on the total weight of the composition.

As described initially above, the composition also includes the first polyamide and the boron oxyacid or salt thereof. Preferably, the boron oxyacid or salt thereof and the first polyamide oligomer are present in a weight ratio of the boron oxyacid or salt thereof to the first polyamide oligomer of from about 0.5:1 to about 5:1, preferably from about 0.5:1 to about 3:1, and more preferably from about 1:1 to about 2:1.

It is to be appreciated by those of ordinary skill in the art that the second polyamide oligomer added via the first polyoxymethylene component may be the only polyamide oligomer added to the composition. In other words, the second polyamide oligomer may be the first polyamide oligomer, if no additional polyamide oligomers are added.

The first polyamide oligomer may be formed similar to the second polyamide oligomer described above and may be selected from any of the suitable second polyamide oligomers listed above. The first and the second polyamide oligomers may be the same or different depending upon the application. The first polyamide oligomer is present in an amount of from about 0.01 to about 10 weight percent based on the total weight of the composition. Preferably, the first polyamide oligomer is present in an amount of from about 0.01 to about 5, and more preferably, from about 0.1 to about 2.5, weight percent based on the total weight of the composition. A preferred first polyamide oligomer is the product sold under the name Ultramid® 1C by BASF Aktiengesellschaft. Another suitable first polyamide oligomer is sold by Du Pont under the name Elvamide®

Suitable acids for forming the boron oxyacid or salt thereof include boracic acid, metaboric acid, and tetraboric acid. Suitable boron salts are alkali metal boron oxyacids, alkaline earth metal boron oxyacids, and metal boron oxyacids. Suitable alkali metals comprise lithium, sodium, potassium, and rubidium. Suitable alkaline earth metals comprise beryllium, magnesium, calcium, and barium. Preferably, the boron oxyacid salt is sodium tetraborate, and more preferably, the boron oxyacid salt is added in a hydrated form as sodium tetraborate decahydrate, commonly referred to as Borax.

The boron oxyacid is added in an amount of from about 0.01 to about 25, preferably from about 0.05 to about 15, and more preferably from about 0.2 to about 10, weight percent based on the total weight of the composition. Without intending to be bound to theory, it is believed that the combination of the boron oxyacid and the first and/or second polyamide oligomers stabilizes the first polyoxymethylene component relative to the conductive filler and prevents the composition from degrading when exposed to certain environments. The boron oxyacid and the polyamide oligomers are less acidic than the conductive filler and as such the boron oxyacid and the polyamide oligomers help to neutralize the first polyoxymethylene component through capping of the polyoxymethylene and by absorbing free radicals that a result from the deterioration of the polyoxymethylene.

In a preferred embodiment, the first polyamide oligomer and the boron oxyacid or salt thereof are provided in an integrally mixed form as a stabilizer component. The stabilizer component can then be added directly into previously made polyoxymethylene components to provide improved resistance to deterioration. The stabilizer may be present in an amount of from about 0.1 to about 20 weight percent based on the total weight of the composition, preferably from about 1 to about 15, and more preferably from about 1 to about 10, weight percent based on the total weight of the composition.

In addition to the first polyamide oligomer and the boron oxyacid or salt thereof, the stabilizer component may also include a second polyoxymethylene component. The second polyoxymethylene component may be formed similarly to the first polyoxymethylene component described above and is preferably the same as the first polyoxymethylene component. One preferred second polyoxymethylene component is commercially available as Ultraform® from BASF Corp. The second polyoxymethylene component may be present in an amount of from about 60 to about 95 weight percent based on the total weight of the stabilizer component.

The boron oxyacid or salt thereof is present in an amount of from about 1 to about 25, preferably from about 1 to about 20, and more preferably from about 5 to about 15, weight percent based on the total weight of the stabilizer component. The first polyamide oligomer is present in an amount of from about 1 to about 15, preferably from about 1 to about 10, and more preferably from about 2.5 to about 10, weight percent based on the total weight of said stabilizer component.

The stabilizer may also include other additives to further stabilize the composition, such as acid scavengers, adhesion promoters, and light stabilizers. These additives may be present in an amount of from about 0.1 to about 10 weight percent based on the total weight of the stabilizer. Suitable acid scavengers include potassium carbonate or magnesium silicate. One commercially available magnesium silicate is Ambosol 500 from PQ Corporation.

In addition to the components described above, the composition may also contain conventional additives and processing assistants. For example, the composition may include formaldehyde or acid scavengers, plasticizers, lubricants, antioxidants, adhesion promoters, light stabilizers and pigments. The amount of such additives is in general from about 0.001 to about 5 weight percent based on the total weight of the composition.

The composition is prepared by mixing the components in a conventional manner as understood by those skilled in the art. Mixing of the components is advantageously carried out in an extruder. Articles formed from polyoxymethylene components have a tendency to deteriorate into free radicals and to form formic acid when exposed to certain environments. However, the composition of the subject invention produces articles that have improved resistance to deterioration when exposed these environments.

The following example, illustrating the formation of an article from the composition according to the subject invention and illustrating certain properties of the article, as presented herein, is intended to illustrate and not limit the subject invention.

EXAMPLES

The composition according to the subject invention was formed from the components listed in Table 1 by weight percent based on the total weight of the composition, unless otherwise indicated.

TABLE 1

Formulation of Composition

|  | First POM Component | Stabilizer | Conductive Filler | Total |
|---|---|---|---|---|
| Examples 1-10 | 93.50 | 4.00 | 2.50 | 100.0 |
| Example 11 | 94.50 | 4.00 | 1.50 | 100.0 |

The first POM component is a copolymer of oxymethylene and dioxolane, commercially available as Ultraform® from BASF Corp. The conductive filler comprises mutilwalled carbon nanotubes commercially available from Hyperion, Inc. The stabilizer was formed from the component listed in Table 2 by weight percent based on the total weight of the stabilizer, unless otherwise indicated. Examples 1 and 2 are control examples having no first polyamide oligomer added and no boron oxyacid salt added, respectively.

TABLE 2

Stabilizer Formulation

|  | Second POM Component | First Polyamide Oligomer | Boron Oxyacid Salt | Additive A | Additive B |
|---|---|---|---|---|---|
| Ex. 1 | 90.25 | 0.00 | 9.75 | 0.00 | 0.00 |
| Ex. 2 | 95.00 | 5.00 | 0.00 | 0.00 | 0.00 |
| Ex. 3 | 75.50 | 5.00 | 19.50 | 0.00 | 0.00 |
| Ex. 4 | 90.12 | 5.00 | 4.88 | 0.00 | 0.00 |
| Ex. 5 | 80.25 | 10.00 | 9.75 | 0.00 | 0.00 |
| Ex. 6 | 87.75 | 2.50 | 9.75 | 0.00 | 0.00 |
| Ex. 7 | 85.00 | 5.00 | 10.00 | 0.00 | 0.00 |
| Ex. 8 | 85.00 | 5.00 | 5.00 | 5.00 | 0.00 |
| Ex. 9 | 87.50 | 2.50 | 5.00 | 5.00 | 0.00 |
| Ex. 10 | 83.75 | 5.00 | 10.00 | 0.00 | 1.25 |
| Ex. 11 | 75.50 | 5.00 | 19.50 | 0.00 | 0.00 |

The second polyoxymethylene component is a copolymer of oxymethylene and dioxolane, commercially available as Ultraform® from BASF Corp. The first polyamide oligomer is copolymer of polyamide 6 and polyamide 6,6 that is dicapped with propionic acid. The boron oxyacid salt is a metal salt of tetraboric acid, commonly referred to as sodium tetraborate decahydrate, also known as Borate. Additive A is potassium carbonate and Additive B is Ambosol 500.

The above compositions underwent a compounding operation as understood by those skilled in the art. The compounding operation dry blends the components together and then compounds the components in a twin screw extruder. The twin screw extruder extrudes a product that is cooled and then the product is pelletized and the pellets are then dried.

The pelletized product is then molded into an article. The article may be formed from injection molding or extrusion molding, or other similar manufacturing techniques. The article may have various shapes depending upon the application. For example, the pelletized product may be molded into disks or tensile bars.

Various physical properties were tested on sample articles formed from the above compositions. The physical properties tested included the following: tensile modulus and stress/strain at yield and break (ISO-527), and Notched Charpy (ISO-179). The surface and volume resistivity at 50% relative humidity (ASTM D4496 & ESD STM 11.11/11.12) for the samples were also tested.

TABLE 3

Physical Property Data

|  | Tensile (MPa) | | Elongation (%) | | |
|---|---|---|---|---|---|
|  | Yield | Break | Yield | Break | Modulus (MPa) |
| Ex. 1 | 63.9 | 63.9 | 7.2 | 7.3 | 4065 |
| Ex. 2 | 60.8 | 60.1 | 8.7 | 13.3 | 3983 |
| Ex. 3 | N/A | 61.8 | N/A | 6.5 | 3820 |
| Ex. 4 | 59.9 | 59.4 | 8.4 | 11.8 | 3241 |
| Ex. 5 | 62.8 | 62.8 | 6.3 | 6.6 | 5424 |
| Ex. 6 | N/A | 63.1 | N/A | 6.8 | 4248 |
| Ex. 7 | 62.2 | 61.8 | 7.7 | 10.0 | 4323 |
| Ex. 8 | N/A | 63.2 | N/A | 6.7 | 4451 |
| Ex. 9 | N/A | 63.1 | N/A | 6.6 | 4202 |
| Ex. 10 | N/A | 63.3 | N/A | 6.1 | 4802 |
| Ex. 11 | 61.2 | 61.2 | 8.1 | 8.7 | 4399 |

Table 4 below illustrates the percent (%) retention of properties for each sample from Examples 1-11 after heat aging at 110° C. and 1,000 hours.

TABLE 4

% Retention After Heat Aging at 110° C. and 1,000 hrs

| % Retention | Tensile stress at break | Tensile strain at break | Notched Charpy impact |
|---|---|---|---|
| Ex. 1 | 104.7 | 63.5 | 65.2 |
| Ex. 2 | 110.2 | 63.7 | 60.3 |
| Ex. 3 | 109.5 | 69.2 | 69.6 |
| Ex. 4 | 110.3 | 60.8 | 68.1 |
| Ex. 5 | 111.5 | 59.0 | 80.4 |
| Ex. 6 | 107.9 | 53.7 | 82.8 |
| Ex. 7 | 108.3 | 95.4 | 70.5 |
| Ex. 8 | 108.1 | 63.5 | 83.1 |
| Ex. 9 | 106.3 | 66.7 | 58.3 |
| Ex. 10 | 104.7 | 68.9 | 85.4 |
| Ex. 11 | 110.2 | 75.3 | 67.6 |

From Tables 3 and 4, the first polyamide oligomer generally reduces the tensile and modulus properties, but increases the elongation properties. Further, the first polyamide oligomer generally increases the percent retention of the tensile stress at break and notched charpy impact properties, and reduces the tensile strain at break properties. The boron oxyacid acid or salt thereof generally reduces the elongation and had little or no effect on the tensile and modulus. The boron oxyacid acid or salt thereof generally increases the tensile strain at break property, and reduces the tensile stress at break and notched charpy impact properties.

Table 5 bellow illustrates other additional properties of the samples formed in Examples 1-11.

TABLE 5

Additional Properties

| | Residual Formaldehyde (PPM) | Nitrogen Weight Loss (%) | Melt Flow Rate (g/10 min) | Melt Volume Rate (cc/10 min) | Resistivity (ASTM D4496) Vol. Res. ($\Omega$-cm) | Resistivity (ASTM D4496) Sur. Res. ($\Omega$/sq) |
|---|---|---|---|---|---|---|
| Ex. 1  | 226 | 1.03 | 24.91 | 21.11 | 5.20E+00 | 4.59E+01 |
| Ex. 2  | 52  | 1.29 | 48.34 | 40.97 | 6.45E+05 | NR |
| Ex. 3  | 158 | 0.90 | 23.32 | 19.76 | 8.18E+00 | 7.79E+01 |
| Ex. 4  | 127 | 0.66 | 50.52 | 42.81 | 6.45E+06 | NR |
| Ex. 5  | 157 | 0.99 | 28.07 | 23.79 | 3.04E+01 | 4.03E+02 |
| Ex. 6  | 152 | 1.16 | 23.31 | 19.75 | 6.03E+00 | 4.01E+01 |
| Ex. 7  | 159 | 0.85 | 44.7  | 37.88 | 1.02E+03 | NR |
| Ex. 8  | 119 | 1.65 | 28.56 | 24.2  | 1.72E+01 | 5.32E+02 |
| Ex. 9  | 177 | 0.62 | 28.14 | 23.85 | 1.21E+01 | 1.78E+02 |
| Ex. 10 | 110 | 1.99 | 20.61 | 17.47 | 1.36E+01 | 9.71E+01 |
| Ex. 11 | 136 | 0.49 | 46.94 | 39.78 | 1.27E+03 | NR |

The presence of the first polyamide oligomer generally lowers the amount of residual formaldehyde, and increases the melt flow rate, the melt volume rate, and the resistivity. The boron oxyacid or salt thereof generally lowers the melt flow rate, the melt volume rate, and the resistivity, and increases the residual formaldehyde.

From the above data trends, it is desirable to provide the article having a low resistivity and high physical properties. Since the presence of the first polyamide oligomer and the boron oxyacid or salt thereof both generally oppositely impact these properties, the amount of the first polyamide oligomer and the boron oxyacid or salt thereof can be optimized for the specific application of the article. For example, some applications may require a lower resistivity, while the physical properties are not as relevant. Likewise, there may be some applications requiring stable physical properties with a higher resistivity.

In addition to the above Examples, another example was formed and the effect of exposure to a fuel was determined. Example 12 was formed according to the composition listed in Table 6 by weight percent based on the total weight of the composition, unless otherwise indicated.

TABLE 6

Formulation of Composition

| | Example 12 |
|---|---|
| First Polyoxymethylene Component | 93.75 |
| Conductive Filler | 2.25 |
| Stabilizer | 4.00 |
| Total | 100.00 |

The polyoxymethylene component is a copolymer of oxymethylene and dioxolane, commercially available as Ultraform® from BASF Corp. The conductive filler is mutilwalled carbon nanotubes commercially available from Hyperion, Inc.

The stabilizer was formed from the components listed in Table 7 by weight percent based on the total weight of the stabilizer, unless otherwise indicated.

TABLE 7

Formulation of Stabilizer

| | Example 12 |
|---|---|
| Second Polyoxymethylene Component | 85 |
| Polyamide Oligomer | 5 |
| Boron Oxyacid Salt | 10 |
| Total | 100 |

The second polyoxymethylene component is a copolymer of oxymethylene and dioxolane, commercially available as Ultraform® from BASF Corp. The polyamide oligomer is copolymer of polyamide 6 and polyamide 6,6 that is dicapped with propionic acid. The boron oxyacid salt is a metal salt of tetraboric acid, commonly referred to as sodium tetraborate decahydrate, also known as Borate.

The above compositions underwent a compounding operation as understood by those skilled in the art. The compounding operation dry blends the components together and then compounds the components in a twin screw extruder. The twin screw extruder extrudes a product that is cooled and then the product is pelletized and the pellets are then dried.

The pelletized product is then molded into an article. The article may be formed from injection molding or extrusion molding, or other similar manufacturing techniques. The article may have various shapes depending upon the application. For example, the pelletized product may be molded into disks or tensile bars.

Various properties were tested on sample articles formed from the above compositions. The physical properties tested included the following: tensile modulus and stress/strain at yield and break (ISO-527), Notched Charpy (ISO-179), and weight gain of a tensile bar. The electrical properties tested included: surface and volume resistance at 50% relative humidity (ASTM D4496, ESD STM 11.11 and 11.12), and static decay (European Standard CECC 00015/1). The sample articles had a volume resistivity of about $1 \times 10^2$ $\Omega$-cm and a surface resistivity of about $1 \times 10^4$ $\Omega$/Sq. The following table lists the physical properties of the sample before soaking (control) in fuel and after soaking in fuel.

TABLE 8

Physical properties of Sample Articles

| Sample | Condition | Strength (Yld) | Elongation (Yld) | Stress (Break) | Strain (Break) | Modulus | n-Charpy | Weight gain |
|---|---|---|---|---|---|---|---|---|
| 1 | Control | 68 | 6 | 67 | 7.2 | 3200 | N/A | ** |
|  | Fuel Soak A | 56 | 10.5 | 53 | 26 | 1700 | N/A | N/A |
|  | % Change | 82% | 175% | 79% | 361% | 53% | N/A |  |
| 2 | Control | 68.7 | 6.90% | 69 | 7% | 3230 | 3.2 | ** |
|  | Fuel Soak B, 150 hours | 60 | 10.60% | 57.6 | 17.40% | 2150 | 3.5 | 2.50% |
|  | % Change | 87% | 153% | 83% | 249% | 67% | 109% |  |
| 3 | Control | 68.1 | 7.30% | 68 | 7.50% | 3165 | 3.3 | ** |
|  | Fuel Soak B, 500 hours | 60 | 10.70% | 57 | 17% | 2160 | 3.4 | 2.70% |
|  | % Change | 88% | 146% | 83% | 226% | 68% | 103% |  |
| 4 | Control | 69.5 | 7.11% | 69.4 | 7.32% | 3153 | 3.13 | ** |
|  | Fuel Soak B, 1000 hours | 61.1 | 10.10% | 60.7 | 11.50% | 2280 | 3.2 | 2.40% |
|  | % Change | 88% | 142% | 87% | 157% | 72% | 101% |  |
| 5 | Control | 69.9 | 7.07% | 69.7 | 7.14% | 3320 | 3 | ** |
|  | Fuel Soak B, 1500 hours | 59.4 | 9.69% | 58.2 | 12.63% | 2320 | 3.16 | 2.30% |
|  | % Change | 85% | 137% | 84% | 177% | 70% | 105% |  |
| 6 | Control | 68.4 | 6.32% | 68.2 | 6.64% | 3200 | 3.12 | ** |
|  | Fuel Soak B, 2000 hours | 59.1 | 9.77% | 58.7 | 11.71% | 2240 | 3.16 | 2.30% |
|  | % Change | 86% | 155% | 86% | 176% | 70% | 101% |  |

The control of each sample was tested prior to any exposure to fuel and the physical properties were recorded. Referring to Sample 1, the sample article underwent a fuel soak A test for 96 hours at 72° C. The fuel mixture used for fuel soak A comprised 5% methanol, 0.5% water, and 84.5% of the following: 50% toluene/30% Iso-Octane/15% Di-Isobutylene/5% Ethanol. The physical properties were recorded and the percent change in the sample was determined.

Samples 2-6 underwent a fuel soak B test for different lengths of time as indicated at 60° C. The fuel mixture used for fuel soak B comprised 15% Methanol and 85% of the following: 50/50 by volume mixture of Isooctane & Toluene (M15) with 10 mMol of tert-butyl hydroperoxide (TBHP) per liter of Isooctane & Toluene mixture. The physical properties were recorded and the percent change was determined.

The samples formed from Example 12 exhibited small amounts of weight gain and exhibited little deterioration of physical properties. Comparing sample 2 to sample 6, after an additional 1950 hours, the physical properties are substantially the same. The samples formed from Example 12 appear to be stable when exposed to such fuel environments, while also having a sufficiently low resistivity.

Figure 1:
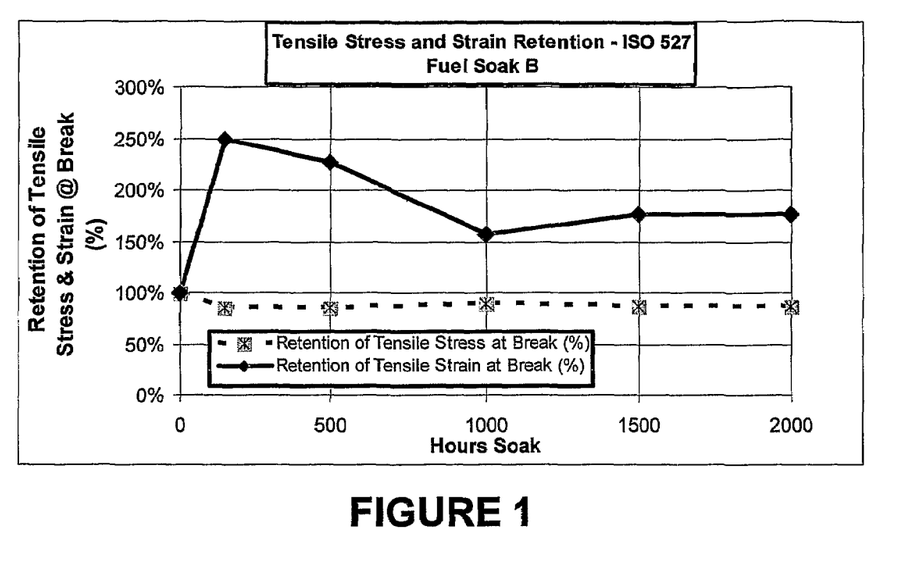
FIG. 1 is a graphical representation of percent retention of tensile stress and strain at break for an article formed from a composition of the subject invention that has been subjected to soaking in hydroperoxide for various amounts of time.
Figure 2:
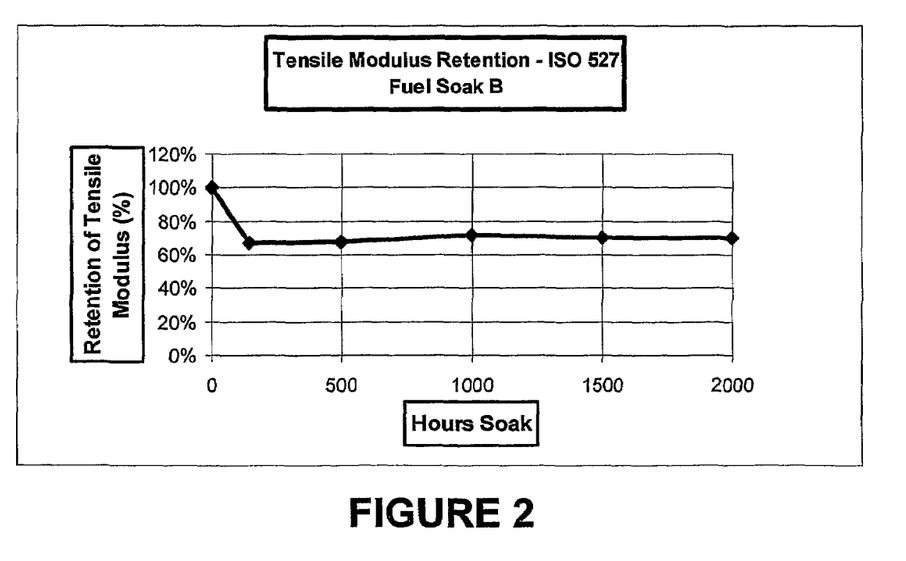
FIG. 2 is a graphical representation of percent retention of tensile modulus for an article formed from a composition of the subject invention that has been subjected to soaking in hydroperoxide for various amounts of time.
Figure 3:
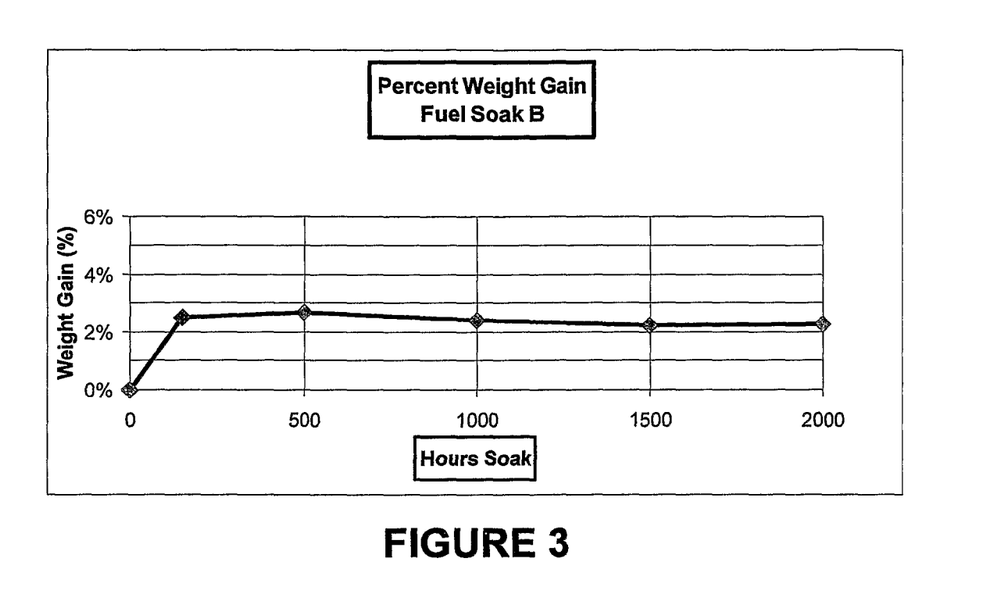
FIG. 3 is a graphical representation of percent weight gain of an article formed from a composition of the subject invention that has been subjected to soaking in hydroperoxide for various amounts of time.
Figure 4:
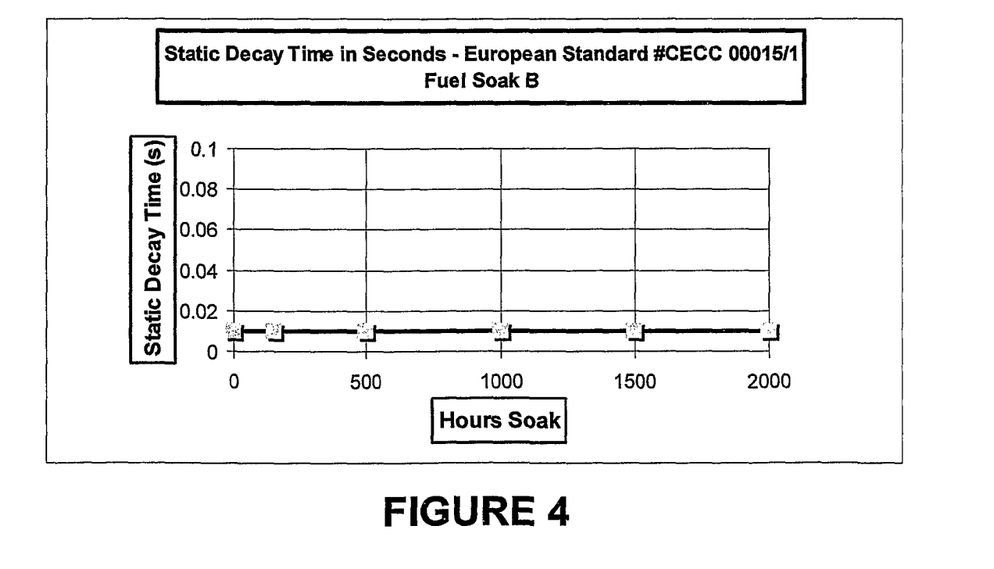
FIG. 4 is a graphical representation of static decay for an article formed from a composition of the subject invention that has been subjected to soaking in hydroperoxide for various amounts of time.
Figure 5:
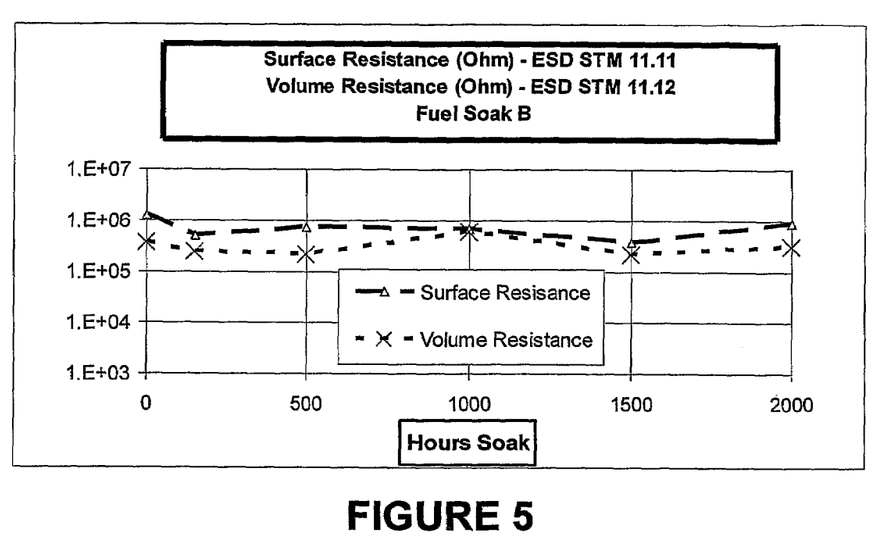
FIG. 5 is a graphical representation of volume and surface resistance of an article formed from a composition of the subject invention that has been subjected to soaking in hydroperoxide for various amounts of time.

Based upon the above test results, articles formed according to the subject invention exhibit improved resistance to deterioration after being soaked. FIGS. 1-5 graphically illustrate the results of these tests. Referring specifically to FIG. 1, the percent retention of tensile stress and strain at break is shown after soaking. The percent retention of tensile stress had dropped slightly below 100%, whereas the percent retention of tensile strain increased above 100%. FIG. 2 illustrates the percent retention of tensile modulus was remained above 60% for all times. FIG. 3 is a graphical representation of the percent weight gain for the samples after soaking. The sample plateaued slightly above about 2%. FIGS. 4 and 5 illustrate conductive properties of the samples. FIG. 5 shows the volume and surface resistance in ohms of the article are illustrated after soaking. The volume and surface resistivity is maintained, which indicates that the article has reduced or eliminated deterioration when exposed to such environments.

Obviously, many modifications and variations of the present invention are possible in light of the above teachings. The invention may be practiced otherwise than as specifically described within the scope of the appended claims.

What is claimed is:

1. A conductive polyoxymethylene composition comprising:
   a first polyoxymethylene component selected from the group consisting of a copolymer of oxymethylene, a homopolymer of oxymethylene, and mixtures thereof, and present in an amount of from about 50 to about 99.5 weight percent based on the total weight of said composition;
   a conductive filler present in an amount of from about 0.1 to about 40 percent by weight based on the total weight of said composition;
   at least one boron oxyacid or salt thereof; and
   at least one first polyamide oligomer, wherein the conductive filler is further defined as a carbon nanotubes.

2. A conductive polyoxymethylene composition as set forth in claim 1 wherein said boron oxyacid or salt thereof and said first polyamide oligomer are present in a weight ratio of said boron oxyacid or salt thereof to said first polyamide oligomer of from about 0.5:1 to about 5:1.

3. A conductive polyoxymethylene composition as set forth in claim 1 wherein said boron oxyacid or salt thereof is present in an amount of from about 0.01 to about 25 weight percent based on the total weight of said composition.

4. A conductive polyoxymethylene composition as set forth in claim 3 wherein said first polyamide oligomer is present in an amount of from about 0.01 to about 10 weight percent based on the total weight of said composition.

5. A conductive polyoxymethylene composition as set forth in claim 1 wherein said boron oxyacid or salt thereof is selected from at least one of alkali metal boron oxyacids, alkaline earth metal boron oxyacids, and metal boron oxyacids.

6. A conductive polyoxymethylene composition as set forth in claim 5 wherein said alkali metal is selected from at least one of a lithium, sodium, potassium, and rubidium.

7. A conductive polyoxymethylene composition as set forth in claim 5 wherein said alkaline earth metal is selected from at least one of beryllium, magnesium, calcium, and barium.

8. A conductive polyoxymethylene composition as set forth in claim 1 wherein said boron oxyacid or salt thereof is further defined as sodium tetraborate decahydrate.

9. A conductive polyoxymethylene composition as set forth in claim 1 wherein said first polyamide oligomer is substantially dicapped.

10. A conductive polyoxymethylene composition as set forth in claim 1 wherein said boron oxyacid or salt thereof and said polyamide oligomer are integrally mixed to provide a stabilizer component.

11. A conductive polyoxymethylene composition as set forth in claim 10 wherein said stabilizer component is present in an amount of from about 0.1 to about 20 weight percent based on the total weight of said composition.

12. A conductive polyoxymethylene composition as set forth in claim 10 wherein said stabilizer component further includes a second polyoxymethylene component comprising a copolymer of oxymethylene, a homopolymer of oxymethylene, and mixtures thereof.

13. A conductive polyoxymethylene composition as set forth in claim 12 wherein said second polyoxymethylene component is present in an amount of from about 60 to about 95 weight percent based on the total weight of said stabilizer component.

14. A conductive polyoxymethylene composition as set forth in claim 13 wherein said boron oxyacid or salt thereof is present in an amount of from about 1 to about 25 weight percent based on the total weight of said stabilizer component.

15. A conductive polyoxymethylene composition as set forth in claim 14 wherein said first polyamide oligomer is present in an amount of from about 1 to about 15 weight percent based on the total weight of said stabilizer component.

16. A conductive polyoxymethylene composition as set forth in claim 1 wherein said first polyamide oligomer has a weight-average molecular weight from about 800 to about 10,000.

17. A conductive polyoxymethylene composition as set forth in claim 1 wherein said first polyamide oligomer includes internal linkages derived from caprolactam or laurolactam.

18. A conductive polyoxymethylene composition as set forth in claim 1 wherein said first polyamide oligomer includes internal linkages derived from at least one of hexamethylene diamine and diethyl adipate; hexamethylene diamine and dodecanedioic acid; hexamethylene diamine and isophthalic acid; hexamethylene diamine, dodecanedioic acid and caprolactam; or hexamethylene diamine, adipic acid and caprolactam.

19. A conductive polyoxymethylene composition as set forth in claim 1 wherein the conductive filler as claimed in claim 1 includes a mixture of other conductive fillers.

20. A conductive polyoxymethylene composition as set forth in claim 19 wherein said carbon nanotube has a diameter of less than about 500 nanometers.

21. A conductive polyoxymethylene composition as set forth in claim 19 wherein said carbon nanotube has a length to diameter ratio of at least 5.

22. A conductive polyoxymethylene composition as set forth in claim 1 wherein said first polyoxymethylene component further comprises a second polyamide oligomer in an amount of from about 0.005 to about 2 weight percent based on the total weight of said polyoxymethylene component.

23. A conductive polyoxymethylene composition as set forth in claim 22 wherein said first polyoxymethylene component further comprises a toughened polymer in an amount of from greater than 0 to about 50 weight percent based on the total weight of said polyoxymethylene component.

24. A conductive polyoxymethylene composition as set forth in claim 23 wherein said first polyoxymethylene component further comprises an antioxidant, a light stabilizer component, and an epoxy-containing compound.

25. An article having improved resistance to deterioration formed from said composition set forth claim 1.

26. A stabilizer component for use in a conductive polyoxymethylene composition, said stabilizer component comprising:
   a polyoxymethylene component selected from the group consisting of a copolymer of oxymethylene, a homopolymer of oxymethylene, and mixtures thereof;
   at least one boron oxyacid or salt thereof;
   at least one first polyamide oligomer;
   said boron oxyacid or salt thereof and said first polyamide oligomer present in an amount to have a weight ratio of said boron oxyacid or salt thereof to said first polyamide oligomer of from about 0.5:1 to about 5:1.

27. A stabilizer component as set forth in claim 26 wherein said boron oxyacid or salt thereof is present in an amount of from about 1 to about 25 weight percent based on the total weight of said stabilizer component.

28. A stabilizer component as set forth in claim 27 wherein said first polyamide oligomer is present in an amount of from about 1 to about 15 weight percent based on the total weight of said stabilizer component.

29. A stabilizer component as set forth in claim 28 wherein said polyoxymethylene component is present in an amount of from about 60 to about 95 weight percent based on the total weight of said stabilizer component.

30. A stabilizer component as set forth in claim 26 wherein said boron oxyacid or salt thereof is selected from at least one of alkali metal boron oxyacids, alkaline earth metal boron oxyacids, and metal boron oxyacids.

31. A stabilizer component as set forth in claim 30 wherein said boron oxyacid or salt thereof is further defined as sodium tetraborate decahydrate.

32. A stabilizer component as set forth in claim 26 wherein said first polyamide oligomer is substantially dicapped.

33. A stabilizer component as set forth in claim 26 wherein said polyoxymethylene component further comprise:
   a second polyamide oligomer;
   a toughened polymer;
   an antioxidant;
   a light stabilizer component; and
   an epoxy-containing compound.

* * * * *